(12) United States Patent
Massey et al.

(10) Patent No.: US 7,721,543 B2
(45) Date of Patent: May 25, 2010

(54) SYSTEM AND METHOD FOR COOLING A COMBUSTION GAS CHARGE

(75) Inventors: Mary Cecelia Massey, San Antonio, TX (US); Thomas Earl Boberg, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 46 days.

(21) Appl. No.: 11/551,871

(22) Filed: Oct. 23, 2006

(65) Prior Publication Data

US 2008/0092539 A1 Apr. 24, 2008

(51) Int. Cl.
F02B 33/44 (2006.01)
F02B 29/04 (2006.01)
F02M 25/07 (2006.01)
F02G 1/00 (2006.01)

(52) U.S. Cl. .......................... 60/618; 60/605.2; 60/599; 60/39.511; 60/39.55

(58) Field of Classification Search .................. 60/618, 60/599, 39.511, 39.55; 62/115; 252/70; 123/568.12, 568.15
See application file for complete search history.

(56) References Cited

U.S. PATENT DOCUMENTS

| | | | | | |
|---|---|---|---|---|---|
| 3,306,032 | A | * | 2/1967 | Chaffotte | 60/599 |
| 4,237,689 | A | * | 12/1980 | Sampietro | 60/599 |
| 4,901,531 | A | * | 2/1990 | Kubo et al. | 60/618 |
| 5,339,632 | A | * | 8/1994 | McCrabb et al. | 60/618 |
| 6,089,020 | A | * | 7/2000 | Kawamura | 60/618 |
| 6,119,457 | A | * | 9/2000 | Kawamura | 60/618 |
| 6,394,076 | B1 | * | 5/2002 | Hudelson | 60/599 |
| 6,708,497 | B2 | * | 3/2004 | Doebbeling et al. | 60/39.511 |
| 6,878,308 | B2 | * | 4/2005 | Schilling | 252/70 |
| 6,880,344 | B2 | | 4/2005 | Radcliff et al. | 60/618 |
| 6,883,325 | B2 | * | 4/2005 | Chomiak | 60/618 |
| 6,907,734 | B2 | | 6/2005 | Shinohara et al. | 60/618 |
| 6,910,333 | B2 | | 6/2005 | Minemi et al. | 60/618 |
| 6,990,805 | B2 | | 1/2006 | Ohta et al. | 123/41.77 |
| 7,017,357 | B2 | * | 3/2006 | Brasz | 62/115 |
| 7,069,884 | B2 | | 7/2006 | Baba et al. | 123/41.77 |
| 7,454,896 | B2 | * | 11/2008 | Chalgren et al. | 60/599 |
| 2003/0005696 | A1 | * | 1/2003 | Wilson | 60/618 |
| 2005/0016193 | A1 | * | 1/2005 | Tarasinski et al. | 62/238.3 |
| 2008/0141985 | A1 | * | 6/2008 | Schernecker et al. | 60/605.2 |
| 2009/0020263 | A1 | * | 1/2009 | Ohsawa et al. | 165/104.11 |

(Continued)

FOREIGN PATENT DOCUMENTS

FR 2861811 A1 * 5/2005

(Continued)

OTHER PUBLICATIONS

A certified English Translation of JP 2003-278607A.*

*Primary Examiner*—Thai Ba Trieu
(74) *Attorney, Agent, or Firm*—Grossman Tucker et al

(57) ABSTRACT

The present invention relates to a system and method for cooling a combustion gas charge prior. The combustion gas charge may include compressed intake air, exhaust gas, or a mixture thereof. An evaporator is provided that may then receive a relatively high temperature combustion gas charge and discharge at a relatively lower temperature. The evaporator may be configured to operate with refrigeration cycle components and/or to receive a fluid below atmospheric pressure as the phase-change cooling medium.

20 Claims, 4 Drawing Sheets

U.S. PATENT DOCUMENTS

2009/0031999 A1 * 2/2009 Erickson .................... 123/563
2009/0211253 A1 * 8/2009 Radcliff et al. ................ 60/670

FOREIGN PATENT DOCUMENTS

| JP | 08261071 A | * | 10/1996 |
| JP | 09032653 A | * | 2/1997 |
| JP | 2003278607 A | * | 10/2003 |
| JP | 2008088811 A | * | 4/2008 |
| JP | 2008088812 A | * | 4/2008 |
| JP | 2009281646 A | * | 12/2009 |
| KR | 2005033153 A | * | 4/2005 |
| WO | WO 2007045768 A1 | * | 4/2007 |

* cited by examiner

SYSTEM AND METHOD FOR COOLING A COMBUSTION GAS CHARGE

This invention was made with government support under Contract No. DE-FC26-00OR22804 awarded by the Department Of Energy (DOE). The government has certain rights in the invention.

FIELD OF THE INVENTION

The present invention relates to a system and method for reducing the temperature of a combustion gas charge including compressed air, exhaust gas, or a mixture thereof. For example, a combustion gas charge including recirculated exhaust gas may be cooled in an evaporator prior to reintroduction to an internal combustion engine.

BACKGROUND OF THE INVENTION

Exhaust gas produced by an internal combustion engine may be recirculated through the engine, rather than discharged into the atmosphere, to reduce emissions and therefore pollution. Prior to recirculation, the exhaust gas may be cooled in an exhaust gas recirculation (EGR) cooler. EGR coolers, however, may not provide efficient heat transfer rates and may result in the exhaust gas having an unacceptable temperature upon reintroduction to the engine. Further, EGR coolers may not cool compressed intake air or mix exhaust gas with compressed intake air. Accordingly, it may be desired to provide a cooling system and method that may be used in addition to or in place of conventional EGR coolers.

SUMMARY OF THE INVENTION

In a first exemplary embodiment, the present disclosure relates to a system or method for cooling a combustion gas charge. The system may employ an evaporator that is capable of receiving the combustion gas charge having a mean temperature $\overline{T_1}$. This may then be followed by discharging the combustion gas charge from the evaporator where the charge may have a mean temperature $\overline{T_2}$, wherein $\overline{T_1} > \overline{T_2}$. The evaporator may also be capable of receiving and discharging a fluid, wherein the fluid may enter the evaporator in a liquid form and exit the evaporator in a vapor form.

In another exemplary embodiment, the present disclosure relates to an internal combustion engine that includes a source of exhaust gas or compressed gas (e.g. the compressed gas discharged from a turbocharger) either of which may provide a combustion gas charge. An evaporator may then be provided that is capable of receiving the combustion gas charge having a mean temperature $\overline{T_1}$ and discharging the combustion gas charge having a mean temperature $\overline{T_2}$, wherein $\overline{T_1} > \overline{T_2}$. The evaporator is also capable of receiving and discharging a fluid, wherein the fluid enters the evaporator in a liquid form and exits the evaporator in a vapor form. The evaporator may be configured to operate with refrigeration cycle components and/or to receive a fluid below atmospheric pressure as the phase-change cooling medium.

BRIEF DESCRIPTION OF THE DRAWINGS

The abovementioned and other features and advantages of the present invention, and the manner of attaining them, will become more apparent and the invention will be better understood by reference to the following description in conjunction with the accompanying drawings wherein.

DETAILED DESCRIPTION OF THE INVENTION

An internal combustion engine may receive a combustion gas charge through an intake manifold coupled to the engine. As used herein, a combustion gas charge may refer to gas employed for combustion and may include compressed intake air, recirculated exhaust gas, or a mixture thereof. The combustion gas charge may be cooled by the system and method of the present invention prior to introduction to the engine. It should be appreciated, however, the system and method of the present invention contemplate applications not only with respect to internal combustion engines of motor vehicles but also with respect to any exhaust-producing system wherein cooling of recirculated exhaust and/or intake air may be desired. For example, exhaust that may be found from the flue gases of boilers, such as boilers used in power generation.

Figure 1:
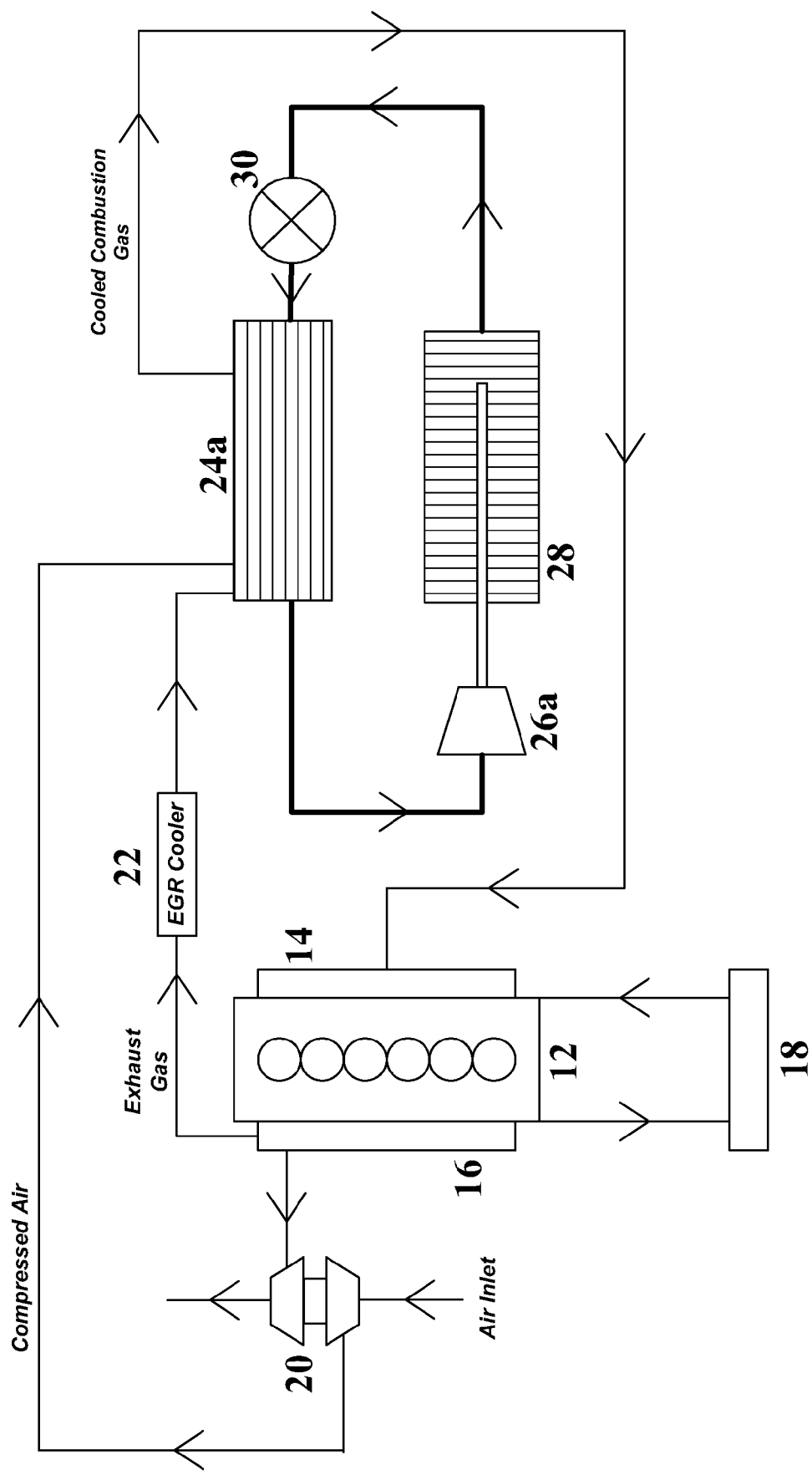
FIG. 1 illustrates an exemplary refrigerant-based cooling system for cooling a combustion gas charge including a mixture of compressed intake air and recirculated exhaust gas prior to introduction to the intake manifold of an engine.

With respect to FIG. 1, a refrigerant-based cooling system may cool a combustion gas charge including compressed air and/or exhaust gas prior to introducing the combustion gas charge to the intake manifold of an engine. An internal combustion engine 12 including an intake manifold 14 and exhaust manifold 16 may be coupled to a radiator 18. Radiator 18 may contain a fluid such as an aqueous glycol solution (i.e., antifreeze) to cool engine 12. The fluid may cool engine 12 by circulating in a closed system between engine 12 and radiator 18 to absorb thermal energy from engine 12 and transport it to radiator 18. Cold air may flow through radiator 18 to cool radiator 18 and the circulating fluid. Accordingly, upon reentry into engine 12, the circulating fluid may have dissipated some thermal energy acquired during the previous cycle and may therefore remove additional heat from engine 12 to maintain the operating temperature of engine 12.

Intake manifold 14 may supply a combustion gas charge to cylinders within engine 12. The exemplary cooling system of FIG. 1 ultimately illustrates a combustion gas charge that contains a mixture of compressed air and exhaust gas. However, it should be appreciated that a mixture is not required, and the combustion gas charge may include either one of compressed air or exhaust gas. Exhaust manifold 16 may collect resulting exhaust gases from the cylinders into a single pipe. The exhaust gases may then be expelled from exhaust manifold 16 into turbocharger 20. The exhaust gases may also be recirculated through the engine system. Recirculated exhaust gas may be pre-cooled in an exhaust gas recirculation (EGR) cooler 22.

Turbocharger 20 may be driven by exhaust gas expelled from exhaust manifold 16. For example, exhaust gas may exit exhaust manifold 16 and enter turbocharger 20 through a first impeller (i.e., a turbine), which may spin in response to the flow of exhaust gas. A shaft may connect the first spinning impeller to a second impeller (i.e., air pump or compressor). Through the connecting shaft, the first spinning impeller may spin the second impeller. The second spinning impeller may intake and compress air from the surrounding environment. The compressed air may enter engine 12 at a later time to provide an increased quantity of oxygen to engine 12 which may then increase power output. It should also be appreciated that the abovementioned features of turbocharger 20 may be not be necessary to provide the features of the present disclosure. It should further be appreciated that another device (e.g., a supercharger) may be substituted for turbocharger 20.

Compressed air from turbocharger 20 and/or exhaust gas from exhaust gas recirculation cooler 22 may then enter evaporator 24a of the refrigeration cycle cooling system. The refrigeration cycle cooling system of FIG. 1 may therefore be understood to include evaporator 24a, compressor 26a, condenser 28 and expansion valve 30. It is also contemplated herein that exhaust gas may enter evaporator 24a without having initially been pre-cooled in exhaust gas recirculation cooler 22. In other words, exhaust gas may exit exhaust manifold 16 and enter evaporator 24a without an interposing pre-cooling treatment.

In the exemplary embodiment of FIG. 1, the compressed air and exhaust gas may be received separately by the evaporator and mixed in evaporator 24a. It is also contemplated that the compressed air and exhaust gas may be mixed prior to entering evaporator 24a and/or after exiting evaporator 24a.

The compressed air and/or exhaust gas may be cooled upon passing through evaporator 24a. The cooled combustion gas charge may exit through a conduit and travel to intake manifold 14. After entering intake manifold 14, engine 12, and the cylinders within engine 12, the combustion gas charge may be expelled from the cylinders into exhaust manifold 16. Thus, the cycle may continue in which some exhaust gas may be recirculated though the system and some exhaust gas may be expelled through turbocharger 20 to drive the intake of additional air.

It should therefore be appreciated that evaporator 24a may be one component of a refrigeration cycle. As alluded to above, the refrigeration cycle components may include compressor 26a, condenser 28, and expansion valve 30. The refrigeration cycle may be a vapor-compression cycle. For example, a circulating refrigerant may enter compressor 26a in the form of a saturated vapor. As used herein, a saturated vapor may refer to a vapor at its saturation temperature and pressure. While in compressor 26a, the saturated vapor may compress at constant entropy and become a superheated vapor. As used herein, a superheated vapor may refer to a vapor having a higher temperature than the saturation temperature corresponding to the pressure of the superheated vapor.

The superheated vapor may enter condenser 28, wherein condenser 28 may be cooled by, e.g., a flow of water and/or air. While in condenser 28, the superheated vapor may be converted to a nonsuperheated vapor. The nonsuperheated vapor may then be converted to a saturated liquid by removing additional heat at constant temperature and pressure. As used herein, a saturated liquid may refer to a liquid at its saturation temperature and pressure.

The saturated liquid may enter expansion valve 30, through which the saturated liquid may partially evaporate at decreased pressure to provide a relatively cold mixture of liquid and vapor. The cold mixture of liquid and vapor may then enter the coils or tubes of evaporator 24a. A relatively warm combustion gas charge passing through evaporator 24a may evaporate the liquid portion of the cold refrigerant mixture, thereby becoming a relatively cool combustion gas charge. The refrigerant may exit evaporator 24a as a saturated vapor to complete the thermodynamic cycle.

It should therefore be appreciated that evaporator 24a may receive a relatively warm combustion gas charge having a mean temperature of $\overline{T_1}$ and discharge a relatively cool combustion gas charge having a mean temperature of $\overline{T_2}$, wherein $\overline{T_1} > \overline{T_2}$. In other words, the combustion gas charge may have a higher temperature upon entering evaporator 24a than upon exiting evaporator 24a.

The refrigerant for use in the above described refrigerant cooling system may be any fluid that absorbs thermal energy (i.e., heat) from a space to be cooled and transfers the heat elsewhere. In one exemplary embodiment, the refrigerant may be fluorocarbon compound, e.g. a halogenated fluorocarbon compound such as dichloromonofluoromethane (i.e., R-21). Dichloromonofluoromethane may provide a relatively high heat of vaporization and a relatively low vapor pressure. Accordingly, other refrigerants may be used to provide the features illustrated in the exemplary embodiment of FIG. 1, including but not limited to available refrigerants identified by the standard R-numbering system.

Expanding upon the above, the selection of refrigerant herein may follow one or more of the following parameters or guidelines: 1. the refrigerant may be one that is considered environmentally sound with respect to a consideration of ozone depletion; 2. the refrigerant may also be one that has an acceptable enthalpy value for a liquid-vapor phase transition at a selected operating condition of the refrigeration cycle, e.g., greater than or equal to about 200 kJ/kg; 3. the operating pressure of the refrigeration cycle may be configured to be relatively similar to the pressure of the combustion air (e.g., $\leq 10$ atmospheres); and 4. the temperature of the phase change of the refrigerant between liquid and vapor may be above ambient temperature but below the temperature of the cooled exhaust gas.

The refrigerant may be provided in a quantity similar to the quantity of compressed air. By providing a quantity of refrigerant similar to that of the compressed intake air, the mass flow and compression ratio of refrigerant compressor 26a may be similar to that of the intake air compressor included in turbocharger 20. Accordingly, refrigerant compressor 26a and intake air compressor included in turbocharger 20 may have similar size and power requirements. It should therefore be appreciated that refrigerant compressor 26a may be driven by an engine powered auxiliary drive belt and may therefore be used in vehicular applications. Thus, the refrigeration cycle illustrated in FIG. 1 (i.e., evaporator 24a, compressor 26a, condenser 28, and expansion valve 30) may cool compressed air and/or recirculated exhaust gas prior to introduction to an internal combustion engine of a motor vehicle (e.g., engine 12).

Figure 2:
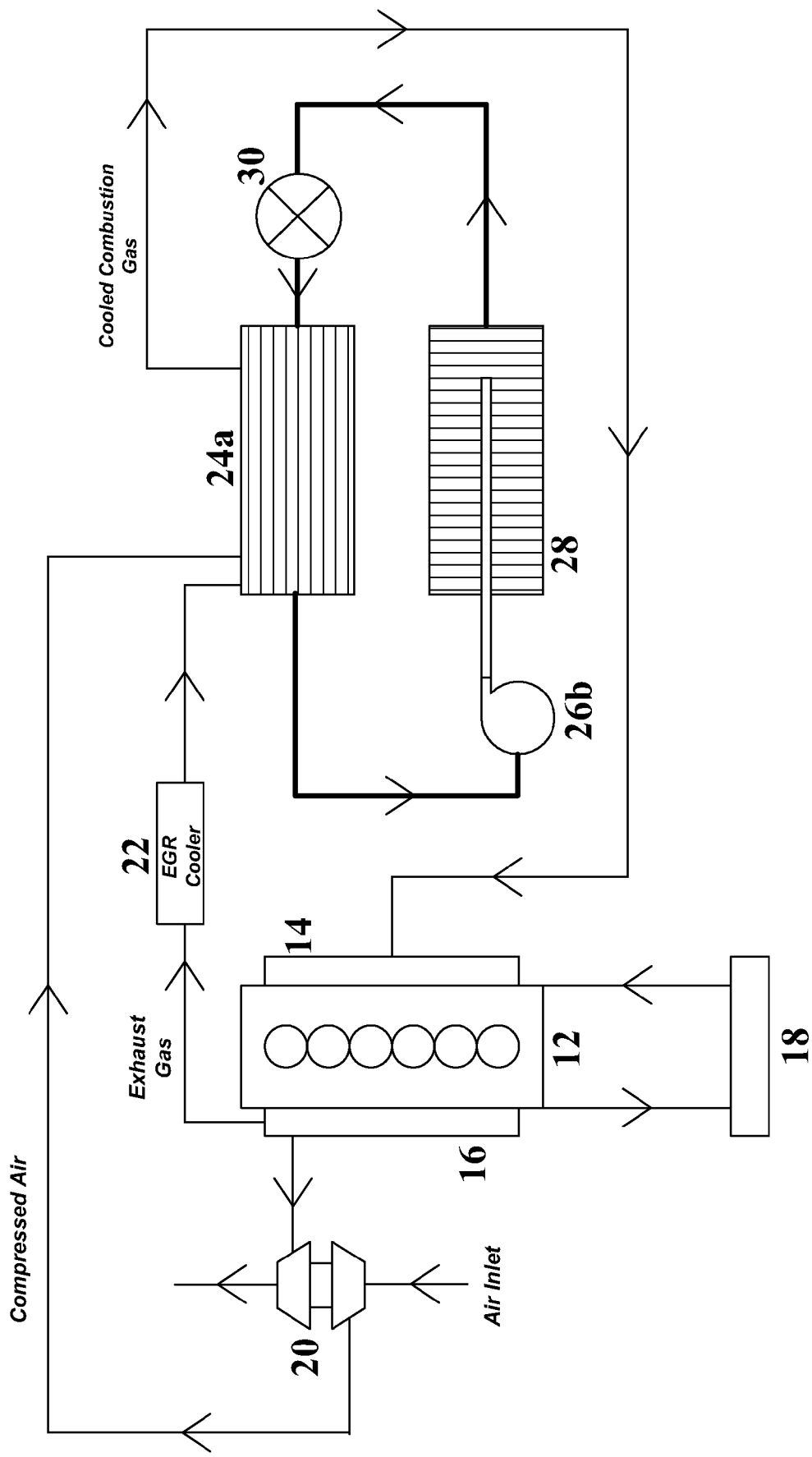
FIG. 2 illustrates an exemplary vapor-liquid, two-phase cooling system for cooling a combustion gas charge including a mixture of compressed intake air and recirculated exhaust gas prior to introduction to the intake manifold of an engine.

FIG. 2 illustrates a vapor-liquid two-phase cooling system that may, e.g., use a fluid such as water below atmospheric pressure as the phase change medium. Such system may therefore cool a combustion gas charge that may include compressed air and/or recirculated exhaust gas prior to introduction to the intake manifold of an engine. As alluded to above, the cooling system may include an engine 12, intake manifold 14, exhaust manifold 16, radiator 18, turbocharger 20, exhaust gas recirculation cooler 22, evaporator 24a, condenser 28, and/or expansion valve 30. Such components may have the same or similar features as the corresponding components of FIG. 1. For example, turbocharger 20 and/or exhaust gas recirculation cooler 22 may be optional components. As another example, the combustion gas charge entering evaporator 24a may include compressed air, exhaust gas, or a mixture thereof. Further, compressed air and recirculated exhaust gas may be mixed in the evaporator 24a, or prior to entering evaporator 24a, and/or after exiting evaporator 24a.

Given the abovementioned related aspects between the systems represented in FIG. 1 and FIG. 2, it should be appreciated that FIG. 2 illustrates another exemplary cooling system of the present disclosure. Such cooling system may include evaporator 24a, vacuum pump 26b, condenser 28, and expansion valve 30. It may therefore be appreciated that vacuum pump 26b of FIG. 2 may replace the compressor 26a of FIG. 1. This feature therefore allows a fluid such as water below atmospheric pressure to be employed as the phase change medium and obviate the need for refrigerant.

It may therefore be appreciated that water may rapidly vaporize and thus boil when it is heated to a temperature having a corresponding vapor pressure that is higher than the pressure of the surrounding atmosphere. For example, water boils at about 100° C. when at atmospheric pressure. Water may also boil in the absence of an increase in temperature when the pressure of the surrounding atmosphere is reduced, thereby creating the requisite pressure differential to induce boiling. Similarly, vacuum pump 26b may remove gas molecules from a sealed volume to create a partial vacuum of relatively low pressure. Thus, vacuum pump 26b may effectively lower the boiling point of water. Water vapor may then flow through vacuum pump 26b as a sub-ambient pressure steam prior to entering condenser 28. Condenser 28 may be sized to lower the temperature of the water vapor to a temperature below the above described vacuum-assisted boiling point. The vacuum assisted boiling point may therefore include any temperature or range of temperatures that are less than 100° C. For example, temperatures that fall in the range of about 50-70° C., and more specifically, temperatures of between about 55-65° C. Accordingly the reduced pressure of the water may be any pressure less than 760 mm Hg including all pressures and increments of pressures therein.

While in condenser 28, the water vapor may be converted to a liquid state. The liquid water may pass through expansion valve 30 and enter the coils of tubes of evaporator 24a. In evaporator 24a, the relatively cool liquid water may absorb thermal energy (i.e., heat) from the relatively warm combustion gas charge also flowing through evaporator 24a. As a result, the water may heat to a temperature above the vacuum-assisted boiling point and convert to a vapor. The water vapor may exit evaporator 24a through a discharge port to complete the thermodynamic cycle.

It may be appreciated that water may have a relatively high heat of vaporization as compared to refrigerant (e.g., dichloromonofluoromethane). Accordingly, the mass flow rate of water required to remove heat from a combustion gas charge in a water-based cooling system may be significantly less than that required of a refrigerant-based cooling system having the same cooling capacity. Thus, a water-based cooling system may operate with relatively reduced size and power requirements and may therefore be fitted on motor vehicles.

The water provided may be relatively pure (i.e., contain minimal concentrations of foreign elements and compounds including sediment, impurities, contaminants, etc.) to minimize scale buildup in the closed loop system. As used herein, scale may refer to a hard layer including calcium (Ca) deposited on the internal surface of a vessel in which water is heated or hot water flows. Optionally, water treatment additives may be added to reduce or inhibit deposit formation, cavitation, rust, corrosion, electrolysis, and/or microbial activity. Also, surfactants may be added to the water to increase wetting of the heat transfer surface and therefore increase heat transfer rates. Examples of such surfactants include HY-PER LUBE SUPER COOLANT by Hy-Per Lube Corporation and NEO KEEP COOL by NEO Synthetic Oil Company.

Further, freezing point depression additives may be added to the water to inhibit freezing when engine 12 is not operating. Such additives may not adversely affect the boiling point of the water. Optionally, an auxiliary heater may be used in place of or in addition to freezing point depression additives to further inhibit freezing of the water.

Figure 3:
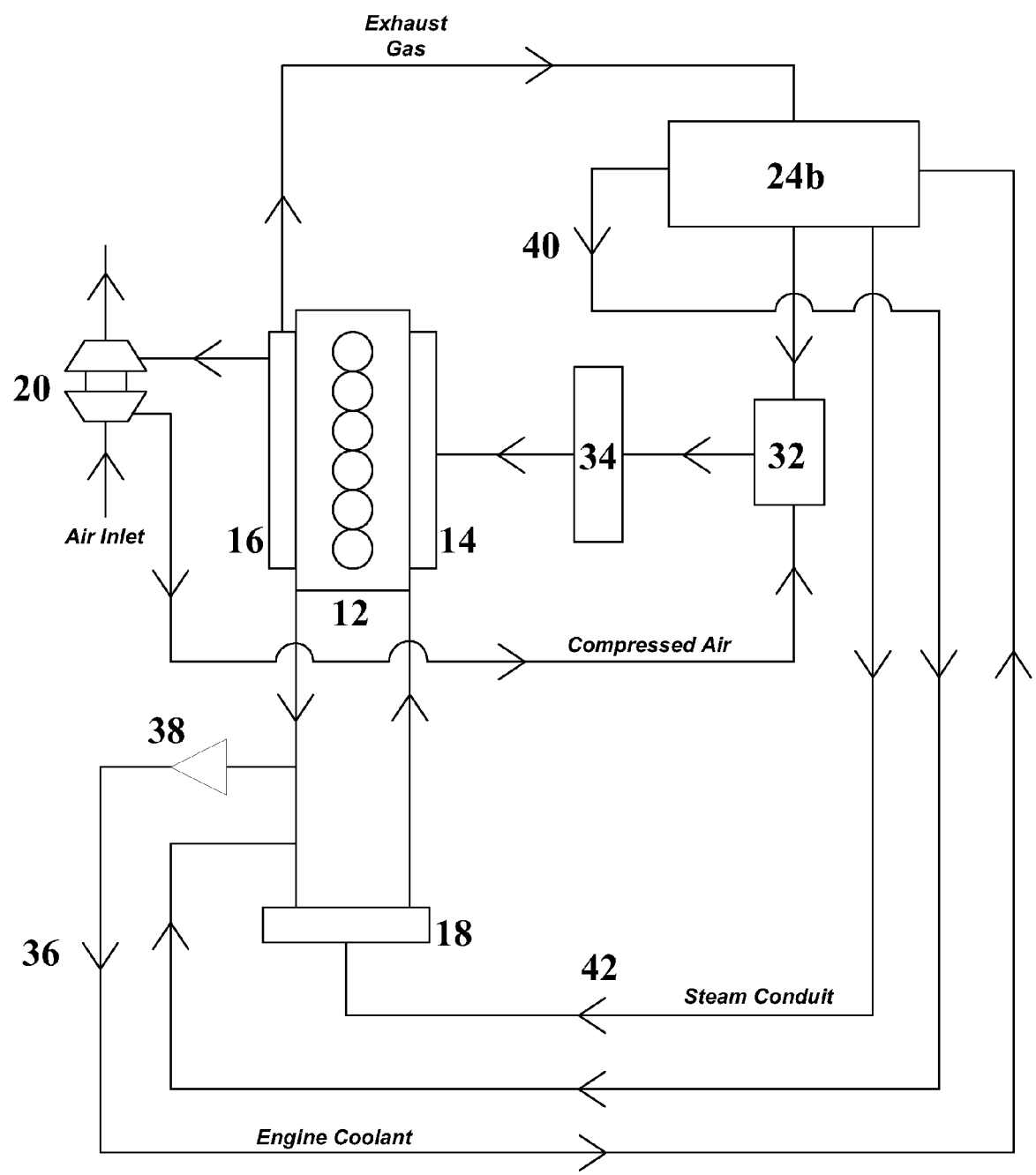
FIG. 3 illustrates an exemplary coolant-based cooling system for cooling recirculated exhaust gas prior to introduction to the intake manifold of an engine.

FIG. 3 illustrates a coolant-based cooling system that may cool recirculated exhaust gas prior to introduction to the intake manifold of an engine. The cooling system may again include an engine 12, intake manifold 14, exhaust manifold 16, radiator 18, and turbocharger 20. Such components may have the same or similar features as the corresponding components of FIG. 1 and/or FIG. 2. For example, turbocharger 20 may be an optional component.

Similar to FIG. 1 and FIG. 2, exhaust gas may exit exhaust manifold 16, wherein a portion of exhaust gas may drive turbocharger 20 and a portion of exhaust gas may be recirculated. The recirculated exhaust gas may flow through evaporator 24b to undergo a reduction in temperature. After cooling, the exhaust gas may enter gas mixer 32 which may mix the cooled exhaust gas with compressed air provided by turbocharger 20. The mixture of compressed air and exhaust gas may flow through Air-to-Air, Combined Charger Cooler (AA-CCC) 34, which may post-cool the combustion gas charge prior to its introduction to intake manifold 14. It should be appreciated, however, that evaporator 24b may mix a combustion gas charge including compressed air and exhaust gas, in which case gas mixer 32 may be an optional component. Similarly, evaporator 24b may have sufficient heat transfer rates to cool a combustion gas charge including compressed air and exhaust gas, in which case Air-to-Air, Combined Charger Cooler (AA-CCC) 34 may also be an optional component.

Evaporator 24b may be an agitated thin film evaporator. A thin film evaporator may be understood a device that may assist in the evaporation of a given fluid by providing a relatively high surface area for promotion of evaporation. The thin film evaporator herein may therefore have a heat transfer surface greater than or equal to about 50 ft$^2$ (4.65 m$^2$), including any such values and any range of values at or above such indicated surface area. For example, a heat transfer surface area of greater than or equal to about 100 ft$^2$ (9.3 m$^2$) or within the range of about 50-500 ft$^2$ (4.54 m$^2$-46.45 m$^2$). Evaporator 24b may therefore force a relatively thin film of fluid against the heat transfer surface (i.e., a heated process wall), wherein the fluid may cover the heated process wall. A vacuum may be applied to minimize processing temperature. Further, evaporator 24b may include wiper blades to reduce or prevent buildup of scale on the heat transfer surface. Accordingly, in the absence of buildup, the fluid may contact an increased surface area of the process wall to improve heat transfer. One example of a commercially available thin film evaporator that may provide the abovementioned features is a ROTO-THERM® Thin Film Evaporator manufactured by Artisan Industries, Inc., Waltham, Mass.

Evaporator 24b may vaporize a fluid such as water from an aqueous solution (e.g. engine coolant) to reduce the temperature of exhaust gas flowing through its interior. Engine coolant herein may therefore be understood to include any combination of water with a colligative agent which refers to any agent that may reduce the freezing point of the solution and/or increase the boiling point. Engine coolant, which typically contains a glycol such a propylene glycol, may therefore be circulated between radiator 18 and evaporator 24b. The engine coolant discharged from engine 12 may exit through flow control valve 38 prior to reaching radiator 18. The engine coolant may travel through cooling conduit 36 to evaporator 24b. The engine coolant may pass isothermally through evaporator 24b wherein the vapor pressure of the relatively hot glycol may be sufficient to vaporize a portion of the water present in the aqueous glycol solution. Vaporization of the water may then provide cooling to exhaust gas simultaneously passing through evaporator 24b. Thus, vaporization of water from the exemplary aqueous glycol solution may cool a combustion gas charge without causing unacceptable scale build-up and/or fouling of heat transfer surfaces.

Vaporization of water may also produce steam. Steam may be discharged through steam conduit 42 and introduced to radiator 18 at an intermediate point (e.g., a midpoint) in the coolant flow path, thereby maximizing the log mean temperature difference. In other words, by introducing the steam midway through radiator 18, the steam may contact precooled coolant to enhance condensation of the steam and prevent boiling of the coolant. Further, by preventing boiling of the coolant, subsequent scale build-up on internal radiator surfaces may also be prevented. The remaining coolant may travel through return coolant conduit 40 and reenter the primary coolant flow between engine 12 and radiator 18. Reentry may occur at a location prior to radiator 18 such that the returning coolant may release thermal energy in radiator 18 prior to entering engine 12.

Additionally, the series configuration of the coolant flow path (i.e., from engine 12, through evaporator 24b, to radiator 18) may provide high temperature coolant to evaporator 24b. The series configuration may also provide improved control over flow volume and flow rate to satisfy combined charge cooling requirements over a wide engine operating range. Further, and as noted above, the vapor pressure of hot glycol may evaporate some of the water in the coolant. It should therefore be appreciated that the heat of vaporization of water may be applied to reduce the temperature of recirculated exhaust gas flowing through evaporator 24b. Optionally, to improve vaporization, the pressure of the coolant passing through evaporator 24b may be controlled. Also, modulation of flow control valve 38 may control coolant flow and, therefore, heat transfer in evaporator 24b under varying engine operating requirements to provide surge cooling capacity.

Figure 4:
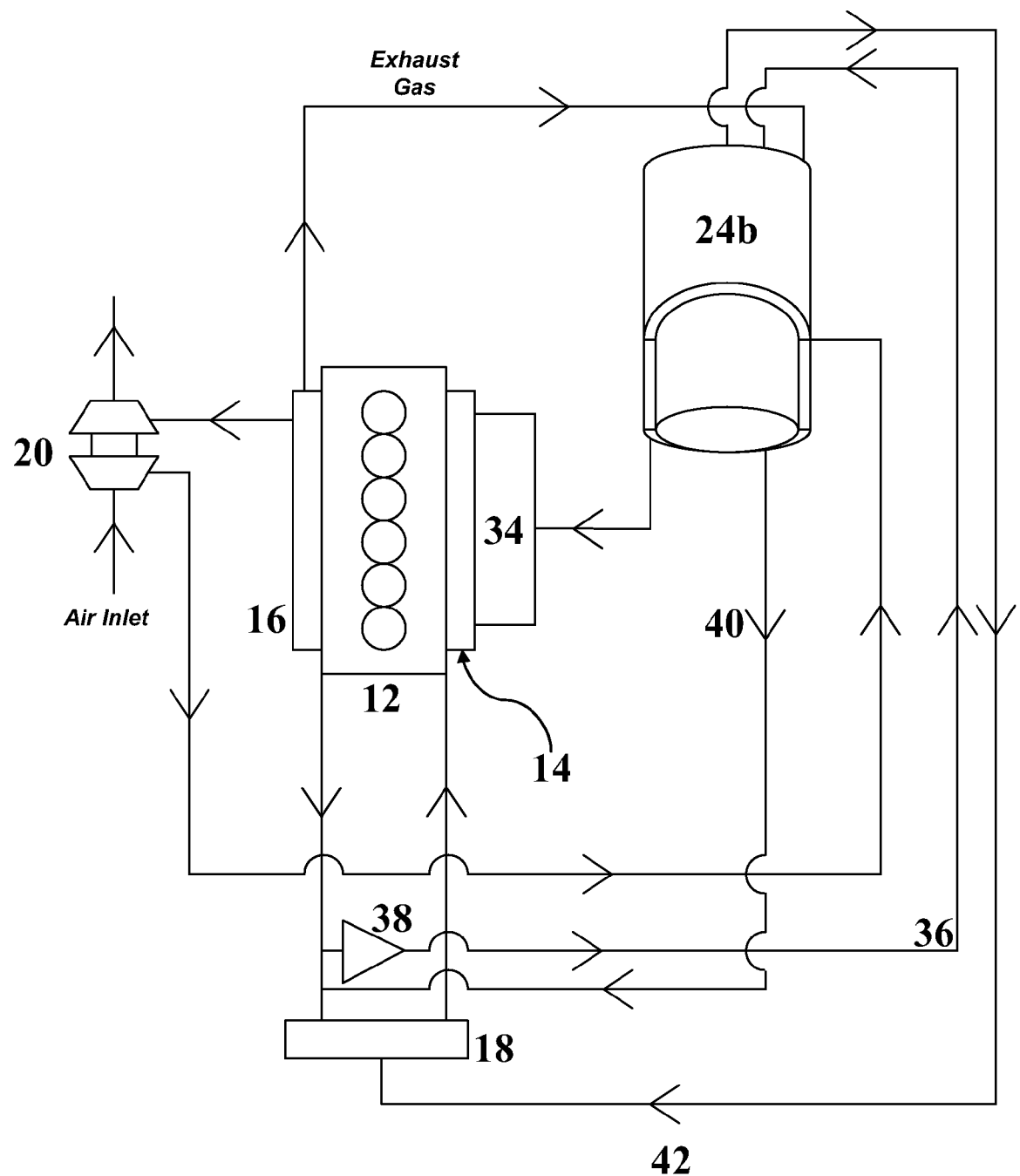
FIG. 4 illustrates an exemplary coolant-based cooling system for cooling a combustion gas charge including a mixture of compressed intake air and recirculated exhaust gas prior to introduction to the intake manifold of an engine.

With respect to FIG. 4, a coolant-based cooling system may cool a combustion gas charge including a mixture of compressed air and exhaust gas prior to introduction to the intake manifold of an engine. Similar to FIG. 3, the cooling system may include an engine 12, intake manifold 14, exhaust manifold 16, radiator 18, turbocharger 20, evaporator 24b, Air-to-Air, Combined Charger Cooler (AA-CCC) 34, cooling conduit 36, flow control valve 38, return cooling conduit 40, and steam conduit 42. Such components may have the same or similar features as the corresponding components of FIG. 3. For example, turbocharger 20 and/or Air-to-Air, Combined Charger Cooler (AA-CCC) may be optional components.

In the exemplary embodiment illustrated in FIG. 4, exhaust gas from exhaust manifold 16 and compressed air from turbocharger 20 may flow through agitated thin film evaporator 24b. The agitated thin film evaporator may include an internally disposed heat transfer chamber defined by a circumferential shell, wherein the circumferential shell may also provide a gas mixing zone in which the exhaust gas and compressed air may be mixed. Evaporator 24b of FIG. 4 is illustrated as having a portion cut therefrom to suggest one possible configuration of such a circumferential shell. Accordingly, a gas mixer (e.g., gas mixer 32 of FIG. 3) may be eliminated. It should be appreciated, however, that the combined combustion gas charge may also be mixed prior to entering evaporator 24b and/or after exiting evaporator 24b. FIG. 4 illustrates the exemplary embodiment in which compressed air and exhaust gas are mixed only in the gas mixing zone of evaporator 24b.

While the exhaust gas may enter evaporator 24b through a feed port at the inlet end of the evaporator, the compressed air may enter evaporator 24b through an auxiliary feed port at an intermediate point between the inlet and outlet ends of the evaporator. Upon flowing through evaporator 24b, the compressed air and exhaust gas may be cooled by the abovementioned process of vaporizing water from an aqueous glycol solution to form steam. The combined combustion gas charge may be discharged from evaporator 24b and introduced to Air-to-Air, Combined Charger Cooler (AA-CCC) 34 for additional cooling prior to entering intake manifold 14. As noted with respect to FIG. 3, however, AA-CCC 34 may be an optional component where evaporator 24b has sufficient heat transfer rates to reduce the temperature of the combustion gas charge to a value acceptable for introduction to intake manifold 14.

The features of the present invention as illustrated in FIG. 1 through FIG. 4 may be further understood by reference to the following examples. The following examples are not intended to limit the scope of the present invention as set forth in the appended claims. In addition, it should be appreciated herein that the various features of the disclosure herein as described above with reference to FIGS. 1-4 are contemplated herein as being interchangeable and components and functionality of the system illustrated in, e.g., FIG. 1 may be utilized in FIG. 2, etc.

EXAMPLE 1

With respect to FIG. 1, an exemplary turbocharged diesel engine (e.g., engine 12) may produce about 468 horsepower (hp) at about 1740 revolutions per minute (rpm). The engine may have a compressed intake air flow rate of about 0.46 kg/s at a temperature of about 232° C. and a pressure of about 2.37 bar. The engine may have a recirculated exhaust gas flow rate of about 0.23 kg/s at a temperature of about 204° C. after passing through an exhaust gas recirculation cooler (e.g., exhaust gas recirculation cooler 22). When mixed, the net compressed intake air and precooled recirculated exhaust gas combustion charge may have a flow rate of about 0.693 kg/s and a temperature of 223° C.

To provide an acceptable intake combustion gas charge temperature of about 66° C., the mixed compressed intake air and recirculated exhaust gas may be cooled by about 114 kW of cooling. This cooling may be provided by passing the combined combustion gas charge through an evaporator (e.g., evaporator 24a) cooled with dichloromonofluoromethane (i.e., R-21). At about 49° C., R-21 may have a heat of vaporization of about 218.6 kJ/kg and may thus require a flow rate of about 0.52 kg/s at a pressure of about 3.84 bar provide about 114 kW of cooling. It should therefore be appreciated that a combined combustion gas charge may be cooled to about 60° C. without operating the refrigeration cycle below about 20° C. Operating the refrigeration cycle below about 20° C. may over-cool the recirculated exhaust gas and therefore increase the occurrence of acid condensate.

As alluded to above, the quantity of R-21 (i.e., about 0.52 kg/s at about 3.84 bar) may be similar to the quantity of compressed intake air (i.e., about 0.46 kg/s at about 2.37 bar). Accordingly, the mass flow and compression ratio of a refrigerant compressor (e.g., compressor 26a) may be similar to that of an intake air compressor (e.g., the intake air compressor included in turbocharger 20). Thus, the size and power requirements of the two compressors may also be similar such that the refrigerant compressor (e.g., compressor 26a) may be driven by an engine powered auxiliary drive belt. It should therefore be appreciated that the cooling system illustrated in FIG. 1 may be fitted on a motor vehicle and used to cool compressed intake air and/or recirculated exhaust gas prior to introduction to engine 12.

EXAMPLE 2

With respect to FIG. 2, an exemplary turbocharged diesel engine (e.g., engine 12) may produce about 468 horsepower (hp) at about 1740 revolutions per minute (rpm). The engine may have a compressed intake air flow rate of about 0.46 kg/s at a temperature of about 232° C. and a pressure of about 2.37 bar. The engine may have a recirculated exhaust gas flow rate of about 0.23 kg/s at a temperature of about 204° C. after passing through an exhaust gas recirculation cooler (e.g., exhaust gas recirculation cooler 22). When mixed, the net compressed intake air and precooled recirculated exhaust gas combustion charge may have a flow rate of about 0.693 kg/s and a temperature of 223° C.

To provide an acceptable intake combustion gas charge temperature of about 66° C., the mixed compressed intake air and recirculated exhaust gas may be cooled by about 114 kW of cooling. This cooling may be provided by passing the combined combustion gas charge through an evaporator (e.g., evaporator 24a) cooled with water. At about 2.9 psia (about 0.2 bar, absolute), water may have a heat of vaporization of about 2,358 kJ/kg and may thus require a flow rate of about 0.05 kg/s under vacuum to provide about 114 kW of cooling at isothermal conditions without allowance for system inefficiencies. The water condenser may operate at 1 bar absolute.

Optionally, a freezing point depression additive may lower the freezing point of water without adversely affecting the boiling point. For example, a mixture of about 30% by weight of ethanol and about 70% by weight of water may freeze at about −20° C. The same mixture may have a latent heat of vaporization of about 1,900 kJ/kg, which may increase the circulating flow rate by about 20% to about 0.06 kg/s.

It should therefore be appreciated that even in the exemplary embodiment in which a freezing point depression additive is added to the water, the mass flow rate may remain relatively low as compared to a refrigerant-based cooling system having the same cooling capacity. Thus, as noted above, a water-based cooling system may operate with reduced size and power requirements and may therefore also be used in vehicular applications.

EXAMPLE 3

With respect to FIG. 3, an exemplary turbocharged diesel engine (e.g., engine 12) may produce about 468 horsepower (hp) at about 1740 revolutions per minute (rpm). The engine may discharge exhaust gas having a temperature of about 544° C., wherein the recirculated exhaust gas flow rate may be about 0.23 kg/s. Prior to mixing with compressed intake air in a gas mixer (e.g., gas mixer 32), the recirculated exhaust gas may be cooled to a temperature of about 204° C. The combined charge (i.e., compressed air and exhaust gas) may then be further cooled (e.g., in AA-CCC 34) to a temperature of about 66° C. before introduction to the intake manifold of an engine (e.g., intake manifold 14).

About 89 kW of cooling may be required to reduce the recirculated exhaust gas temperature from about 544° C. to about 204° C. This cooling may be provided by an agitated thin film evaporator (e.g., evaporator 24b) having a relatively low aqueous glycol solution flow rate of about 4.88 kg/s, wherein the aqueous glycol solution may have a temperature of about 90-100° C. For comparison, conventional evaporation systems may require relatively high flow rates of about 7.62 kg/s to provide a similar amount of cooling (i.e., 89 kW).

Given a solution flow rate of about 4.88 kg/s, the aqueous glycol solution flowing through the evaporator may produce about 33 g/s of steam. The steam may represent less than about 1% by weight of the aqueous glycol solution flow and, therefore, the separation of steam from the solution may not significantly change the concentration of the solution. Accordingly, the operating pressure of the engine cooling system may be similar to that of a conventional engine cooling system.

The steam may then be reintroduced into a radiator (e.g., radiator 18) through which the remainder of the solution may be flowing. The steam may condense and remix with the solution.

EXAMPLE 4

With respect to FIG. 4, an exemplary turbocharged diesel engine (e.g., engine 12) may produce about 468 horsepower (hp) at about 1740 revolutions per minute (rpm). The engine may discharge exhaust gas having a temperature of about 544° C., wherein the recirculated exhaust gas flow rate may be about 0.23 kg/s. The engine may also have a compressed intake air flow rate of about 0.46 kg/s at a temperature of about 232° C. after compression.

The recirculated exhaust gas may be introduced to an agitated thin film evaporator (e.g., evaporator 24b) through a feed port at the inlet end of the evaporator. The compressed air may be introduced to a circumferential shell of the evaporator through an auxiliary feed port at an intermediate point between the inlet and outlet ends of the evaporator. The shell may provide a mixing zone, wherein partially cooled recirculated exhaust gas and compressed air may mix. The resulting combined combustion gas charge may have a net flow rate of about 0.69 kg/s and a temperature of about 230° C. The combined combustion gas charge may be cooled to a temperature of about 150° C. prior to discharge from the evaporator and into an Air-to-Air, Combined Charger Cooler (AA-CCC) (e.g., AA-CCC 34). Accordingly, due to precooling the combined combustion gas charge in the agitated thin film evaporator, the size of the AA-CCC may be reduced and a gas mixer may be eliminated.

Expanding on the above, a flow of engine coolant discharged from the engine may exit the engine-radiator flow path through a flow control valve (e.g., flow control valve 38) and travel through a cooling conduit (e.g., cooling conduit 36) to the evaporator. The coolant, which may have a temperature of about 100° C. upon discharge from the engine, may pass isothermally through the evaporator. Accordingly, the coolant may exit the evaporator at a temperature of about 100° C. Such coolant may be returned to the primary engine-radiator flow path through a return cooling conduit (e.g., return cooling conduit 40). Steam produced in the evaporator from water in the coolant may exit through a steam conduit (e.g., steam conduit 42). Such steam may be introduced to the radiator to condense and mix with the primary coolant flow. This may occur at a point between the coolant inlet and coolant outlet ports of the radiator (e.g., at a midpoint along the length of the radiator). Thus, the coolant temperature may remain below about 100° C. upon mixing with the condensed steam.

What is claimed is:

1. A method for cooling a combustion gas charge for combustion in an engine comprising:

providing a refrigerant compressor, a condenser, and an expansion valve in fluid communication with an evaporator, said evaporator receiving said combustion gas charge, said combustion gas charge comprising exhaust gas and compressed air, said exhaust gas and compressed air received separately by the evaporator;

wherein aid exhaust gas and compressed air are mixed in the evaporator;

circulating a refrigerant through said evaporator, wherein said refrigerant enters said evaporator in at least liquid form and exits said evaporator in a vapor form; and directing said combustion gas charge through said evaporator, wherein said combustion gas charge has a higher mean temperature upon entering said evaporator than upon exiting said evaporator.

2. The method of claim 1 wherein said refrigerant comprises water and separating water vapor from said refrigerant.

3. The method of claim 2 further comprising delivering said water vapor to an engine radiator.

4. The method of claim 1 further comprising cooling said exhaust gas prior to directing said exhaust to said evaporator.

5. The method of claim 1 wherein said refrigerant comprises water at a pressure less than 760 mm Hg.

6. The method of claim 1 wherein said evaporator has an internal surface area greater than or equal to about 50 ft$^2$.

7. The method of claim 1 wherein said refrigerant comprises a fluorocarbon compound.

8. The method of claim 1 wherein said refrigerant comprises an aqueous solution having a colligative agent.

9. A system for cooling a combustion gas charge for combustion in an engine comprising:

a refrigerant compressor, a condenser, and an expansion valve in fluid communication with an evaporator;

said evaporator receiving said combustion gas charge having a mean temperature $\overline{T_1}$, said combustion gas charge comprising exhaust gas and compressed air, said exhaust gas and compressed air received separately by the evaporator, wherein aid exhaust gas and compressed air are mixed in the evaporator; and discharging said combustion gas charge from said evaporator having a mean temperature $\overline{T_1}$, wherein $\overline{T_1} > \overline{T_2}$; and said evaporator receiving and discharging a refrigerant, wherein said refrigerant enters said evaporator in at least liquid form and exits said evaporator in a vapor form.

10. The cooling system of claim 9 wherein said evaporator has an internal surface area greater than or equal to about 50 ft$^2$.

11. The cooling system of claim 9 wherein said refrigerant comprises a fluorocarbon compound.

12. The cooling system of claim 9 wherein said refrigerant comprises water at a pressure less than 760 mm Hg.

13. The cooling system of claim 9 wherein said refrigerant comprises an aqueous solution having a colligative agent.

14. The cooling system of claim 9 wherein said compressed air is sourced from a turbocharger.

15. An internal combustion engine comprising:

a source of exhaust gas and a source of compressed air;

a system for cooling a combustion gas charge comprising:

a refrigerant compressor, a condenser, and an expansion valve in fluid communication with an evaporator;

said evaporator receiving said combustion gas charge having a mean temperature $\overline{T_1}$, said combustion gas charge comprising said exhaust gas and said compressed air (emphasis added), said exhaust gas and compressed air received separately by the evaporator; wherein aid exhaust qas and compressed air are mixed in the evaporator; and discharging said combustion gas charge from said evaporator having a mean temperature $\overline{T_2}$, wherein $\overline{T_1} > \overline{T_2}$; and said evaporator receiving and discharging a refrigerant, wherein said refrigerant enters said evaporator in at least liquid form and exits said evaporator in a vapor form.

16. The engine of claim 15 wherein said evaporator has an internal surface area greater than or equal to about 50 ft$^2$.

17. The engine of claim 15 wherein said refrigerant comprises a fluorocarbon compound.

18. The engine of claim 15 wherein said refrigerant comprises an aqueous solution having a colligative agent.

19. The engine of claim 15 wherein said refrigerant comprises water at a pressure less than 760 mm Hg.

20. The engine of claim 15 wherein said compressed air is sourced from a turbocharger.

* * * * *

UNITED STATES PATENT AND TRADEMARK OFFICE
CERTIFICATE OF CORRECTION

PATENT NO. : 7,721,543 B2 Page 1 of 1
APPLICATION NO. : 11/551871
DATED : May 25, 2010
INVENTOR(S) : Mary Cecelia Massey and Thomas Earl Boberg It is certified that error appears in the above-identified patent and that said Letters Patent is hereby corrected as shown below:

In column 11, lines 30 - 44, please replace Claim 9 with the following Claim:

9. A system for cooling a combustion gas charge for combustion in an engine comprising:
a refrigerant compressor, a condenser, and an expansion valve in fluid communication with an evaporator;
said evaporator receiving said combustion gas charge having a mean temperature $\overline{T_1}$, said combustion gas charge comprising exhaust gas and compressed air, said exhaust gas and compressed air received separately by the evaporator, wherein said exhaust gas and compressed air are mixed in the evaporator; and discharging said combustion gas charge from said evaporator having a mean temperature $\overline{T_2}$, wherein $\overline{T_1} > \overline{T_2}$; and said evaporator receiving and discharging a refrigerant, wherein said refrigerant enters said evaporator in at least liquid form and exits said evaporator in a vapor form.

Signed and Sealed this

Twenty-seventh Day of July, 2010

David J. Kappos
*Director of the United States Patent and Trademark Office*